United States Patent [19]

Castellani et al.

[11] 4,186,375
[45] Jan. 29, 1980

[54] MAGNETIC STORAGE SYSTEMS FOR CODED NUMERICAL DATA WITH REVERSIBLE TRANSCODING INTO HIGH DENSITY BIPOLAR CODE OF ORDER N

[75] Inventors: Jean-Louis Castellani; Edmond Flayosc; Jean Pasternak, all of Paris, France

[73] Assignee: Thomson-CSF, Paris, France

[21] Appl. No.: 900,663

[22] Filed: Apr. 27, 1978

[30] Foreign Application Priority Data

Apr. 29, 1977 [FR] France .............................. 77 12953

[51] Int. Cl.² .............................................. G11B 5/09
[52] U.S. Cl. .................................................... 360/40
[58] Field of Search ................. 360/40, 51; 325/38 A, 325/38 B

[56] References Cited

U.S. PATENT DOCUMENTS

| 3,418,631 | 12/1968 | Sipress et al. | 325/38 A |
| 3,671,959 | 6/1972 | Amano | 325/38 A |
| 3,783,383 | 1/1974 | Forster et al. | 325/38 A |
| 3,828,346 | 8/1974 | Forster et al. | 325/38 A |

*Primary Examiner*—Vincent P. Canney
*Attorney, Agent, or Firm*—Oblon, Fisher, Spivak, McClelland & Maier

[57] ABSTRACT

A system for storing high-density numerical data. The system uses means for recording and reading coded data on a magnetic support. This means is associated with transcoders by which it is possible to change from a binary code to the high density bipolar code of order n and vice versa.

5 Claims, 7 Drawing Figures

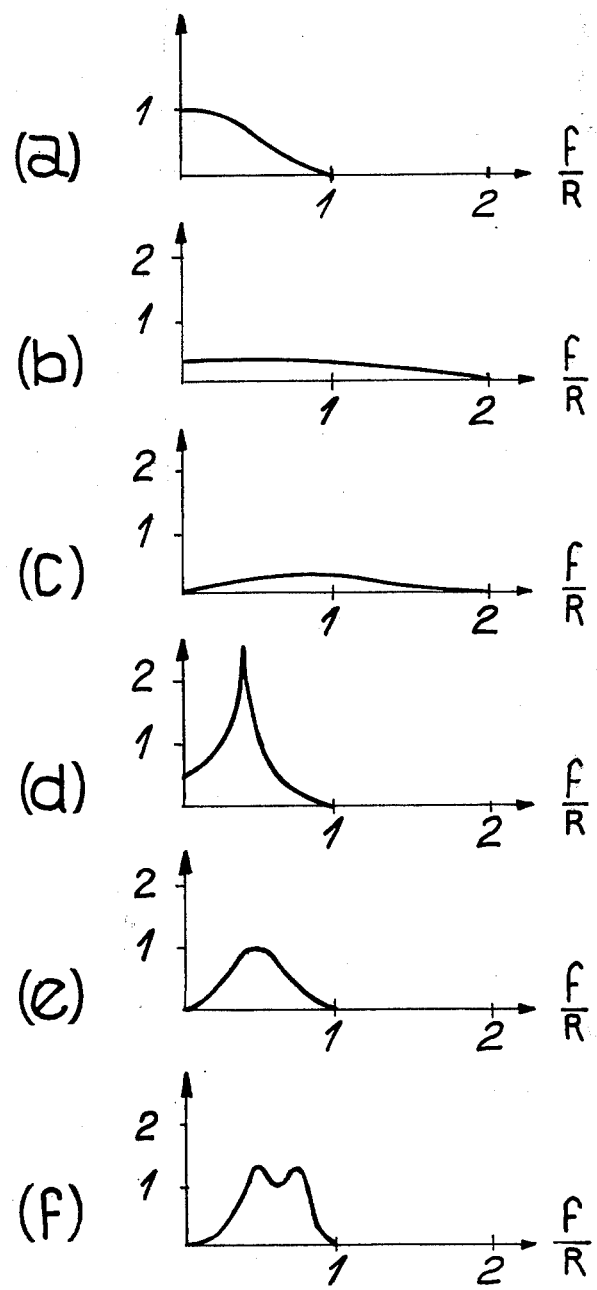

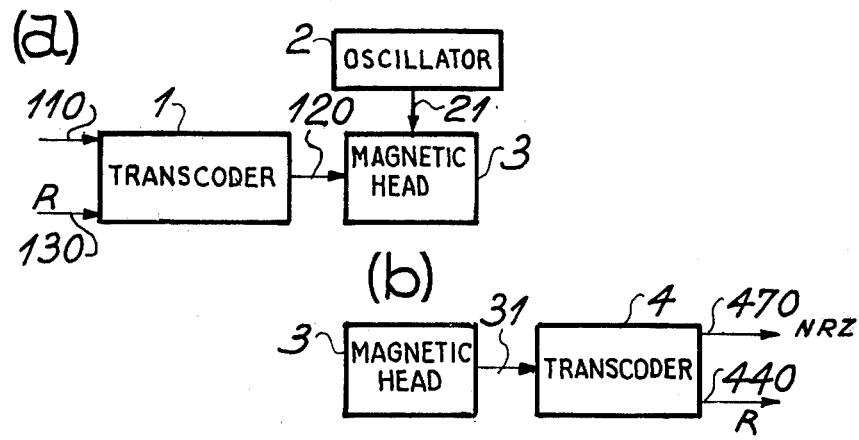
Fig_3
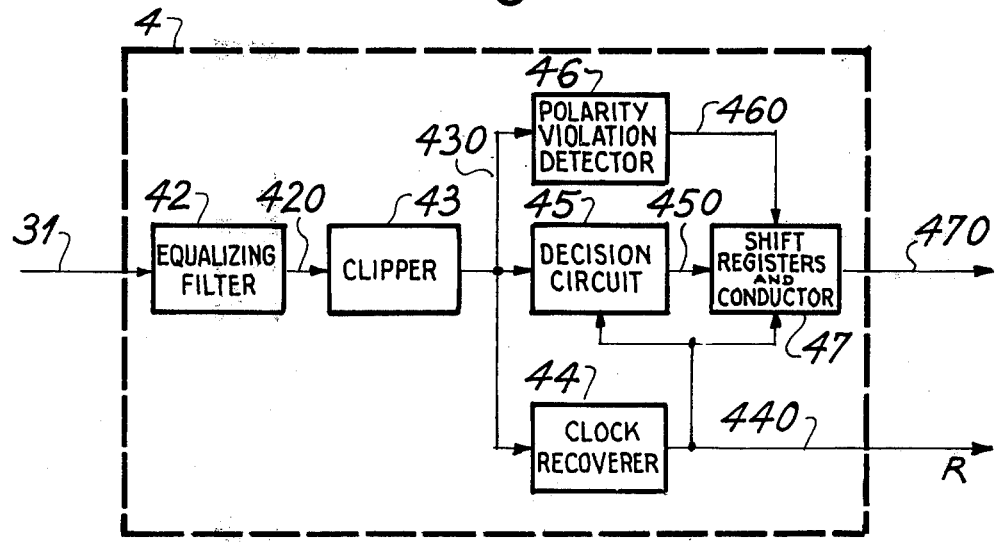
Fig_4
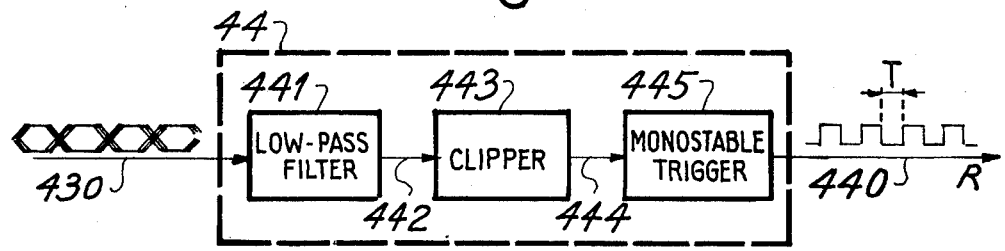
Fig_5

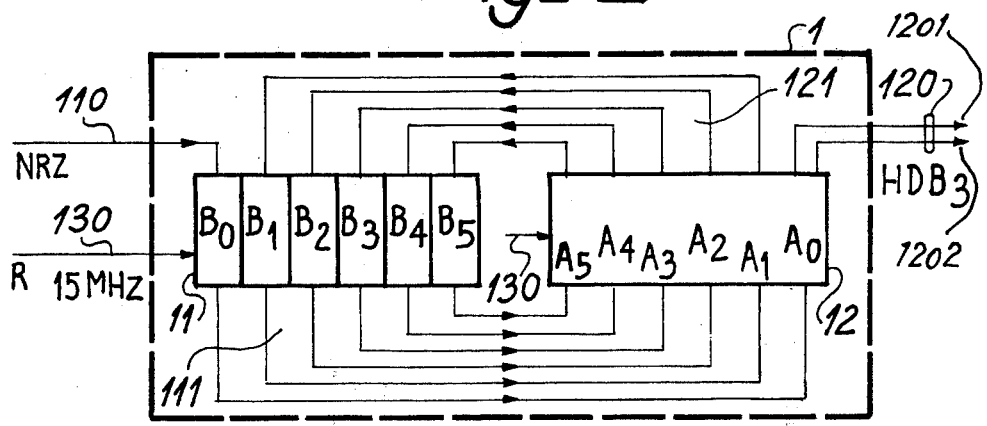
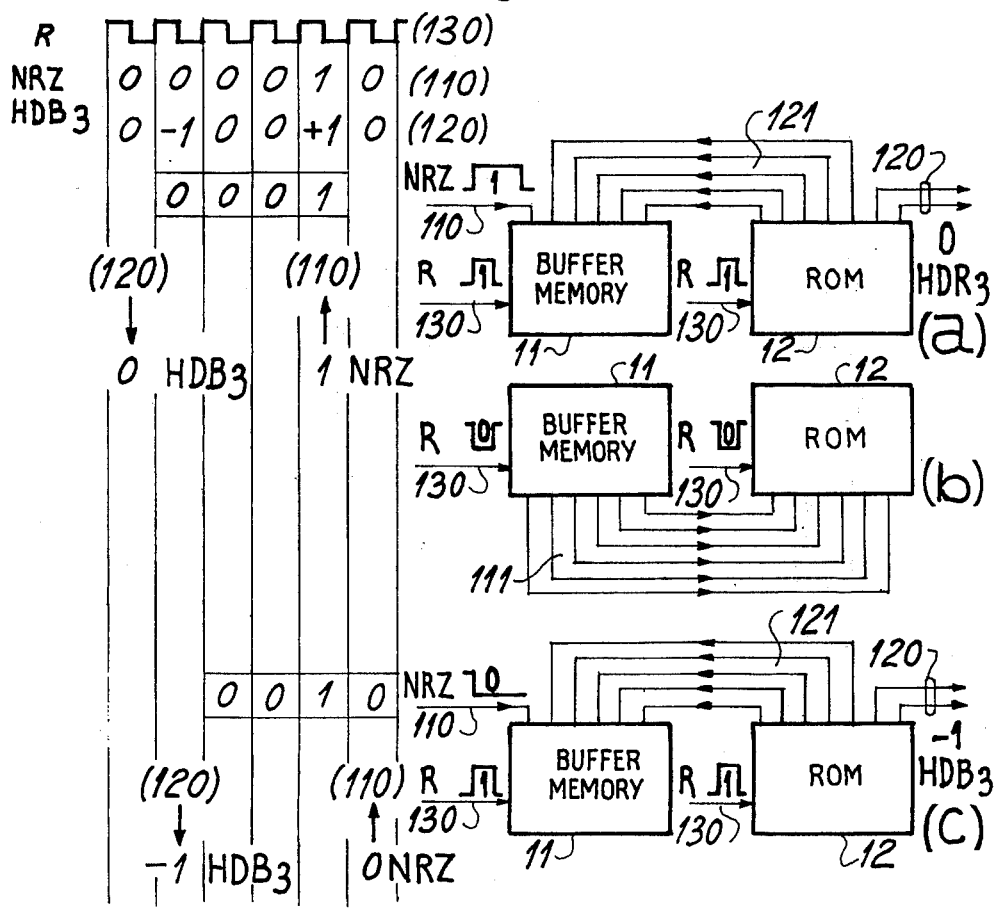

MAGNETIC STORAGE SYSTEMS FOR CODED NUMERICAL DATA WITH REVERSIBLE TRANSCODING INTO HIGH DENSITY BIPOLAR CODE OF ORDER N

BACKGROUND OF THE INVENTION

This invention relates to a magnetic storage system for coded numerical data with code conversion into and from high density bipolar code of order n.

There is a problem involved in the high-density recording on magnetic tape of numerical data supplied for example by a sonar system.

This problem is primarily to obtain a recording-reading cycle for a maximum flow of numerical data allowing for the band width of the recording system. To this end, it is necessary:

on the one hand to avoid delivering to the recorder signals having a continuous component which the recorder would be unable to restore;

on the other hand to be able to carry out reading at a clock frequency without which, the numerical signals recorded could not be decoded, and in addition to obtain a recording-reading cycle with a minimum of transcription errors whilst, at the same time, avoiding the need for complex and sophisticated hardware.

The solution to the problem provided by the invention in the field of recording signals of the sonar type, may be directly transferred to other fields, involving the high-density recording of numerical signals, particularly to the data processing side of telecommunications and radar and to the field of space.

Various codes are used by specialists, of which the principal representatives are known in abbeviated from as NRZ (non-reset to zero), RZ (reset to zero), MILLER, BI-PHASE and their derivatives.

These codes have advantages and/or disadvantages which, in the field of magnetic recording, are primarily associated with the band width of the spectrum of the numerical code, the central frequency of that spectrum, the transmission of low frequencies and, in particular, of the continuous component, and with the difficulty of restoring the signals to the clock frequency required for decoding during readout.

Thus, the disadvantage of an excessively wide band width is encountered in the RZ and BI-PHASE codes, the disadvantage of an excessively high central frequency is encountered in the BI-PHASE code, the disadvantage of the existence of a continuous component is encountered in the NRZ and RZ codes and, to a lesser extent, in the MILLER code and the disadvantage of being unable to restore the clock signals during excessively long sequence of "1" or excessively long sequences of "0" is encountered in the NRZ and RZ codes.

Artifices are used for overcoming the various difficulties, giving rise to other codes such as, for example, the enhanced NRZ code, the scrambled NRZ code and the square MILLER code. They use complex, expensive and unstable circuits which lack flexibility or fail to attain the performance expected of them.

The various codes to which reference has so far been made are binary codes, i.e. codes having only two levels "0" and "1" or, which amounts to the same, −1 and +1.

SUMMARY OF THE INVENTION

According to the present invention, it is proposed, for transferring coded data in the form of digital signals onto magnetic tape, to use a series of codes known as high-density bipolar codes of order n or, in short, $HDB_n$, the index n signifying that n consecutive "0"'s at the most will appear in the modulation. The initials HDB are derived from the expression "High Density Bipolar."

The codes in question are selected from other ternary codes, i.e. codes having three levels −1, 0 and +1, such as are described for example in an article by A. Croisier published in IEEE Transactions on Communication Technology, volume COM-18, June 1970, page 265.

These codes were introduced during the investigation into high-density long-range line transmissions in whose case the error level appearing at each repeater has to be particularly low.

According to one aspect of the present invention a magnetic storage system for numerical data comprising recording and reading means, a first transcoder for recording, and a second transcoder for reading data being stored in high-density bipolar code of order n, $HDB_n$ is short, and in that the first transcoder fed with the binary data (NRZ) of a signal at one input and with a clock signal (R) at its other input delivers ternary data coded in code of the $HDB_n$ type and its output connected to a recorder, and in that the second transcoder receives the $HDB_n$ recorded signal and delivers the binary data of the signal at one of its outputs and the reconstituted clock signal (R) at another output.

BRIEF DESCRIPTION OF THE DRAWING

Advantages and features of the invention will become apparent from the following description given by way of example and illustrated by the accompanying drawings, wherein:

FIG. 2, diagrams a to f, shows the spectral energy density respectively corresponding to the diagrams of the codes illustrated;

FIG. 3 is a synoptic block diagram of the recording section (FIG. 3a) and of the reading section (FIG. 3b);

FIG. 4 is a synoptic diagram of the transcoder associated with the reader;

FIG. 5 is a synoptic diagram of the circuit for restoring the clock signal;

FIG. 6 is a synoptic diagram of the memory-equipped transcoder supplying the signal to be recorded in $HDB_n$ code;

FIG. 7 shows simplified diagrams of the memory transcoder showing three successive operating periods with modified addresses at 7a, 7b and then at 7c.

DETAILED DESCRIPTION

Figure 1:
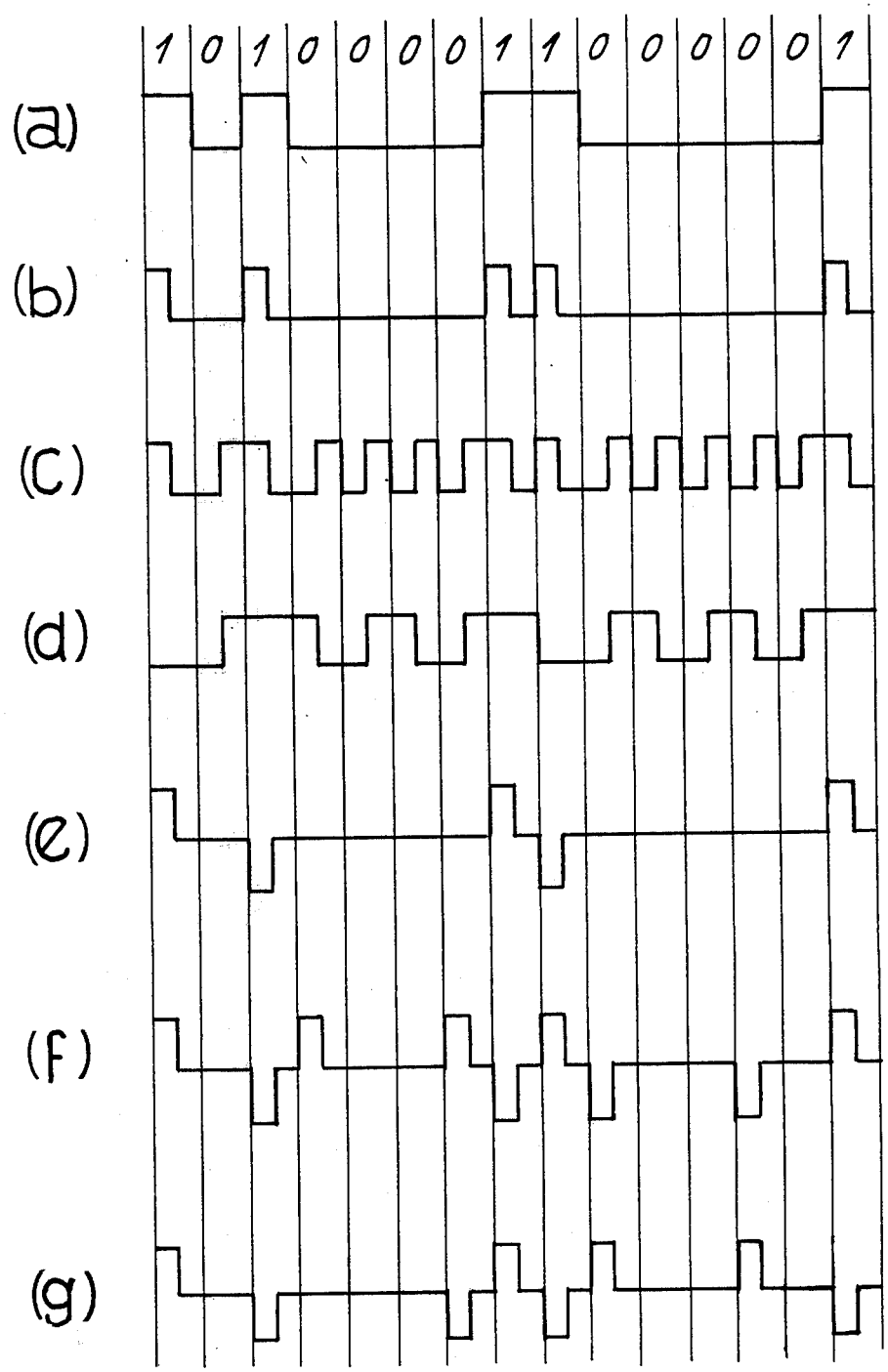
FIG. 1, diagrams a to g, shows the forms of some codes.

For a better understanding of the choice according to the invention of the $HDB_n$ codes in the recording of numerical data on magnetic tape, it might be useful to recall the rules under which the various above-mentioned codes used in magnetic recording are established and to give the corresponding energy spectrums.

The "0"'s and the "1"'s of the elementary binary signal have a duration T corresponding to a clock frequency $R = 1/T$.

NRZ-code:

"1" is coded 1

"0" is coded 0

One example of a signal in NRZ-code is given in FIG. 1a. The corresponding energy spectrum is given in FIG. 2a.

RZ-code:
"1" is coded 10, each of width T/2
"0" is coded 00, each of width T/2

One example of a signal in RZ-code is given in FIG. 1b and the corresponding energy spectrum is given in FIG. 2b.

BI-PHASE-L-code:
"1" is coded 1 then 0, each of width T/2
"0" is coded 0 then 1, each of width T/2

One example of a signal in BI-PHASE-L-code is given in FIG. 1c and its spectrum is given in FIG. 2c.

MILLER-code:

The signal is first coded in BI-PHASE-L-code, after which the frequency of the transmissions is divided by 2, only taking into account for example the 0→1 transitions.

One example of a signal in MILLER code is given in FIG. 1d and its spectrum is given in FIG. 2d.

It is this code whose characteristics come closest to the code used in the invention. It has the disadvantage of being sensitive to noise as a result of its derivative restoration process.

$HDB_n$-code:

These codes are ternary codes derived from the bipolar code. The principle on which this code is formed is as follows:

the "1"'s are alternately coded: 1 0 each of width T/2 then 1 0, each similarly of width T/2, "0" is coded 00, each similarly of width T/2.

On example of a signal in bipolar code is shown in FIG. 1e and its spectrum is shown in FIG. 2e.

The advantages of this code emanating from the three-level coding and from the alternation $+1$, $-1$, are clearly visible in FIG. 2e:

total absence of any continuous component, irrespective of the content of the message and low frequency components of negligible importance.

maximum energy centered on about 0.5 R.

If, however, long zero sequences have been recorded, there is no longer any possibility, when the signal is re-read, of relocating the clock signal R required for decoding.

It is for this reason that supplementary data are systematically introduced into the $HDB_n$-codes during the zero sequences. They are then eliminated when the said code is read during the decoding operation.

The principle on which the $HDB_n$-codes are formed is as follows:

providing the binary sequence to be transmitted does not include more than n consecutive zeros, these codes are identical with the bipolar code;

a supplementary signal 10 or $-10$ is introduced in place of the last zero of a sequence of $n+1$ zero, the choice being such that the alternation is "violated," i.e. such that its polarity is the same as that of the last pulse;

the first zero of this sequence of $n+1$ zero is translated by 00 either by a 10 or by a $-10$, the choice being such that two successive alternation violations are always opposite in sign.

FIG. 1f shows a signal in $HDB_3$ code when the preceding alternation violation is negative.

FIG. 1g shows the same signal in $HDB_3$ code when the preceding alternation violation is positive.

FIG. 2f shows the energy spectrum of the $HDB_3$ code. It can be seen that the energy spectrums of the $HDB_n$ code show only one maximum if n is even and two maxima if n is odd. These spectra come closer to the energy spectrum of the bipolar code, the larger the value of n.

The choice of the $HDB_3$ code is based primarily on the shape of its energy spectrum of which the advantage appears when FIGS. 2a to 2f are compared with one another. This is because the desired criteria for the high-density magnetic recording of numerical data are: no component at the zero frequency which can only be re-read by the principle of reading by variation of magnetic flux; the lowest possible central frequency to be able to pass the maximum flow; narrow band width.

It is interesting here to note the interdependence between the binary flow of the message to be transmitted and the upper limit to the band width of the recorder. In effect, due to the formation of the $HDB_3$-code which is a ternary code, the band width required for transmitting the signal coded in $HDB_3$ code is theoretically divided by $\log_2 3 = 1.6$.

The advantages emanating from the use of $HDB_n$-codes in the recording of numerical data on magnetic tape will also appear more clearly from the following description of one example of the proposed system intended for recording numerical data on magnetic tape using the $HDB_3$-code.

The synoptic plan of a system such as this is shown in FIGS. 3a and 3b. This system comprises, in its recording section (FIG. 3a), a first transcoder 1 using $HDB_3$-code which, at one input terminal 110, receives the binary data in NRZ code of the message to be recorded and, at its other terminal 130, the clock signals R associated with the binary data received. At its output 120, it delivers the data coded in $HDB_3$-code intended to be recorded by a magnetic recorder 3.

At its output 21, a generator 2 known as a pre-magnetisation generator delivers a 50 Mc/s signal which is superimposed upon the signal applied at 120 in the recording head of the magnetic recorder 3.

The circuits of one of the embodiments of the transcoder 1 are shown in FIG. 6. The transcoder advantageously comprises a buffer memory 11 and a read-only memory (ROM) 12, the two memories being of conventional design.

At its input terminals 110 and 121, the buffer memory 11 receives words of 6 bits $B_0$, $B_1$, $B_2$, $B_3$, $B_4$ and $B_5$ of which the bit $B_0$ having the lowest weight, or LSB is short, is given by the signal in NRZ code applied at 110, whilst the other 5 bits are supplied by the read-only memory 12. At its output terminals 111, the buffer memory emits words of 6 bits at the order of the clock signals 130 having as their destination the address inputs $A_0$, $A_1$, ... $A_5$ of the read-only memory 12.

The mode of operation of the memory transcoder 1 will be better understood by referring to FIGS. 1a, 1f and 1g which respectively show a given NRZ signal and the two resulting possibilities of $HDB_3$-coding according to the polarity of the preceding violation.

A block of 4 consecutive digits and the number of possible combinations of these digits are examined. There are $2^4 = 16$ binary combinations and $3^4 = 81$ ternary combinations. However, the characteristics of the $HDB_3$-code, for example the absence of two consecutive identical polarities, the absence of four consecutive zeros ..., mean that the number of $HDB_3$ combinations comes down to 32 for each of the two cases which may be envisaged, namely the case where the polarity of the preceding violation is negative and the case where the polarity of the preceding violation is positive, i.e. to 64 cases. All these cases are memorised once and for all in the read only memory 12, the outputs 111 of the buffer memory 11 acting as addresses to 64 memory cells.

FIGS. 7a to 7c show one example of the formation of addresses. If, starting out from the coded message shown at the top left of FIG. 7 and going down that Figure, FIG. 7a which shows the recording of the content of a block of 4 consecutive digits of the NRZ message in the transcoder 1 is examined at a given instant and if the recording indicated in FIG. 7c of the content of that block is compared with the recording corresponding to a time advance equal to $T=1/R$ supplied by the clock signal 130, i.e. an advance by one digit, the following block, by progressing, has experienced on the one hand the departure of one digit which will be the digit to be coded and, on the other hand, the introduction of one digit which, with the three digits which have remained common to the two blocks in question, supplies the address of the following combination. Each of the cells of the memory 12 will therefore contain in coded form on the one hand the level +1, or 0, or −1, which it will emit at 120 during the departure of one digit in each clock period R and, on the other hand, part of the address of the following combination which it will emit at 121 towards the buffer memory 11 as destination. Thus, it may be said that the collection of data arriving at the inputs 121 and 110 represent the address to come.

More precisely the output 120 comprises terminals 1201 and 1202 connected to the ROM 12. The HDB$_3$ coded signal called C, corresponding to the binary data E$_1$ and E$_2$ coming out respectively from terminals 1201 and 1202, is given by Table A

| E$_1$ | E$_2$ | C |
|---|---|---|
| 1 | 0 | 1 |
| 0 | 0 | 0 |
| 0 | 1 | −1 |

The circuit delivering the HDB$_3$ signal C, from the digits E$_1$ and E$_2$ is not represented, as being well known in prior art.

Table 2 shows as an example for a given address A in decimal form, the values B$_5$, B$_4$, B$_3$, B$_2$ and B$_1$ B in short, sent to the buffer memory and the C value corresponding to the E$_1$ and E$_2$ values (The E$_1$ and E$_2$ are not indicated on Table 2).

Table 2

| A | C | B$_5$ | B$_4$ | B$_3$ | B$_2$ | B$_1$ | A | C | B$_5$ | B$_4$ | B$_3$ | B$_2$ | B$_1$ |
|---|---|---|---|---|---|---|---|---|---|---|---|---|---|
| 0 | −1 | 0 | 1 | 0 | 0 | 1 | 22 | 0 | 0 | 1 | 1 | 1 | 0 |
| 1 | 0 | 0 | 0 | 0 | 0 | 1 | 23 | 0 | 0 | 1 | 1 | 1 | 1 |
| 2 | 0 | 0 | 0 | 0 | 1 | 0 | 24 | −1 | 1 | 1 | 0 | 0 | 0 |
| 3 | 0 | 0 | 0 | 0 | 1 | 1 | 25 | −1 | 1 | 1 | 0 | 0 | 1 |
| 4 | 0 | 0 | 0 | 1 | 0 | 0 | 26 | −1 | 1 | 1 | 0 | 1 | 0 |
| 5 | 0 | 0 | 0 | 1 | 0 | 1 | 27 | −1 | 1 | 1 | 0 | 1 | 1 |
| 6 | 0 | 0 | 0 | 1 | 1 | 0 | 28 | −1 | 1 | 1 | 1 | 0 | 0 |
| 7 | 0 | 0 | 0 | 1 | 1 | 1 | 29 | −1 | 1 | 1 | 1 | 0 | 1 |
| 8 | −1 | 1 | 0 | 0 | 0 | 0 | 30 | −1 | 1 | 1 | 1 | 1 | 0 |
| 9 | −1 | 1 | 0 | 0 | 0 | 1 | 31 | −1 | 1 | 1 | 1 | 1 | 1 |
| 10 | −1 | 1 | 0 | 0 | 1 | 0 | 32 | 0 | 0 | 1 | 0 | 0 | 1 |
| 11 | −1 | 1 | 0 | 0 | 1 | 1 | 33 | 0 | 1 | 0 | 0 | 0 | 1 |
| 12 | −1 | 1 | 0 | 1 | 0 | 0 | 34 | 0 | 1 | 0 | 0 | 1 | 0 |
| 13 | −1 | 1 | 0 | 1 | 0 | 1 | 35 | 0 | 1 | 0 | 0 | 1 | 1 |
| 14 | −1 | 1 | 0 | 1 | 1 | 0 | 36 | 0 | 1 | 0 | 1 | 0 | 0 |
| 15 | −1 | 1 | 0 | 1 | 1 | 1 | 37 | 0 | 1 | 0 | 1 | 0 | 1 |
| 16 | 0 | 1 | 0 | 0 | 0 | 1 | 38 | 0 | 1 | 0 | 1 | 1 | 0 |

Table 2-continued

| 17 | 0 | 0 | 1 | 0 | 0 | 1 | 39 | 0 | 1 | 0 | 1 | 1 | 1 |
| 18 | 0 | 0 | 1 | 0 | 1 | 0 | 40 | +1 | 0 | 0 | 0 | 0 | 0 |
| 19 | 0 | 0 | 1 | 0 | 1 | 1 | 41 | +1 | 0 | 0 | 0 | 0 | 1 |

| A | C | B$_5$ | B$_4$ | B$_3$ | B$_2$ | B$_1$ |
|---|---|---|---|---|---|---|
| 44 | +1 | 0 | 0 | 1 | 0 | 0 |
| 45 | +1 | 0 | 0 | 1 | 0 | 1 |
| 46 | +1 | 0 | 0 | 1 | 1 | 0 |
| 47 | +1 | 0 | 0 | 1 | 1 | 1 |
| 48 | +1 | 1 | 0 | 0 | 0 | 1 |
| 49 | 0 | 1 | 1 | 0 | 0 | 1 |
| 50 | 0 | 1 | 1 | 0 | 1 | 0 |
| 51 | 0 | 1 | 1 | 0 | 1 | 1 |
| 52 | 0 | 1 | 1 | 1 | 0 | 0 |
| 53 | 0 | 1 | 1 | 1 | 0 | 1 |
| 54 | 0 | 1 | 1 | 1 | 1 | 0 |
| 55 | 0 | 1 | 1 | 1 | 1 | 1 |
| 56 | +1 | 0 | 1 | 0 | 0 | 0 |
| 57 | +1 | 0 | 1 | 0 | 0 | 1 |
| 58 | +1 | 0 | 1 | 0 | 1 | 0 |
| 59 | +1 | 0 | 1 | 0 | 1 | 1 |
| 60 | +1 | 0 | 1 | 1 | 0 | 0 |
| 61 | +1 | 0 | 1 | 1 | 0 | 1 |
| 62 | +1 | 0 | 1 | 1 | 1 | 0 |
| 63 | +1 | 0 | 1 | 1 | 1 | 1 |

A decimal address of memory 12,

B$_5$, B$_4$, B$_3$, B$_2$ and B$_1$ binary data sent to buffer memory 11,

C ternary data output at 120.

If at an instant A=0, the digital word B sent to the buffer memory is 01001 and C=−1. If now a "0" is arriving (B$_0$=0) the address A in digital form is 010010, or 18 in decimal form. Looking on table 2 the new value for B is 01010 and C=0 and so on . . .

The HDB$_3$ coded signal is delayed four periods of the clock to the corresponding NRZ signal.

The sequential operation of the transcoding system is shown by in a first period, FIG. 7a, for example during the 1's of the clock signals 130, the buffer memory is loaded at 121 with the address signals B$_1$, B$_2$, B$_3$, B$_4$ and B$_5$ to come, emanating from the read only memory 12 and with the signal B$_0$ at the input 110 emanating from the NRZ digit which arrives at that instant.

During this period, the data 111 leaving the buffer memory 11 represent the actual address by which it is possible precisely to obtain from the read-only memory 12 on the one hand at 121 the part of the address to come and, on the other hand at 120, the digit coded in HDB$_3$.

In a second period, FIG. 7b, for example during the 0's of the clock signals 130, the preceding signals appear at 111 of which the data represent the new address of one of the 64 cells of the read only memory 12.

In a third period, FIG. 7c, for example during the 1's of the clock signals 130, i.e. during a period synchronous with the first period, the content of the memory cell of 12 addressed during the preceding period is read. From its content, as mentioned above, there is obtained on the one hand at 120 the signal coded in HDB$_3$ and, on the other hand at 121, a part of the address to come.

During this period, the following NRZ digit arrives at 110, and so on . . .

The HDB$_3$ coded outputs is connected to one of the inputs 120 of the magnetic recorder (3). This recorder has the characteristics normally required for high-volume recorders.

The apparatus used is with advantage a magnetoscope, for example of the TTV 3500 type manufactured by THOMSON-CSF which has the following characteristics:

| | |
|---|---|
| width of the magnetic tape: | 2 inches |
| tape speed: | 8 inches per second (IPS) |
| width of the magnetic head: | 0.15 mm |
| rotational speed of the magnetic head: | 150 rpm |
| band width at −3 dB: | 3 to 18 Mc/s |
| recording time: | 3 hours with a 31 cm diameter reel. |

In its reading section shown in FIG. 3b, the system comprises another transcoder. The data in HDB$_3$-code available at 31 at the output end of the recorder 3 are decoded by a circuit 4 and the binary data, fed in at 110 during recording, reappear at the output 470.

This circuit 4 is formed by the other transcoder mentioned above of which a simplified diagram is shown in FIG. 4. It comprises first of all a corrector 42 of which the function is to correct as exactly as possible the amplitude and phase response of the equivalent quadripole formed by the connection in series of the recording head/magnetic quadripole and the tape/reading head quadripole. The signals thus corrected are subjected to + and − clipping in a circuit 43 by comparison with two voltages equal to +V$_{max}$/2 and −V$_{max}$/2, V$_{max}$ being the maximum voltage available at the output 420. The output 430 of the circuit 43 is connected to the respective inputs, of a circuit 44 of which the function is to restore the clock signals and of a decision circuit 45 whose function is, in co-operation with the clock signals 440, to test the clipped signals 430 at a precise instant fixed by the clock signals 440 so as to restore at 450 the square signals of the HDB$_3$ code, and of a circuit 46 whose function is to detect the violations of alternating polarity introduced by the circuit of the first transcoder 1 at the moment of recording.

There is an additional advantage of the HDB$_3$ code to be noted here, namely the possibility of extracting from the signal itself the clock signals required for the decoder in the above-mentioned decision circuit 45 which may therefore be called "reading circuit."

In effect, the signals 430 are not binary signals, but instead simple clipped analog signals. The restoration of the original signals requires a reading circuit of which the decision instant is an extremely precise instant fixed at regular intervals by the clock signal. It is at these precise instants that the circuit 45 reads the signal 430 and decides if 450 has the value 1 or 0 or −1.

A circuit 47 comprising two shift registers followed by a subtractor receives on the one hand the HDB$_3$ signals at 450 and, on the other hand, the clock signals R at 440 and, finally the polarity violation signals at 460. One shift register receives the positive and the other the negative signals. The output of the two shift registors is subtracted. When the only existing sequences are sequences of one and less than 4 zeros, the circuit 47 delivers the signals such as it has received them at its output 47. When a violation is detected by the circuit 46, the signal 460 resets the shift registers 47 to zero so that it then emits a sequence of 4 zeros.

It has been seen that the signals of the HDB$_n$-codes never comprised a sequence of more than n zeros and that this characteristic of these codes enables sufficient energy to be retained in the coded signal, even during long messages comprising only zeros, to enable the clock signals required for decoding to be restored.

The circuit 44 for restoring the clock signals is known in FIG. 5. It comprises a low pass filter 441 followed by a clipper 443 at its input end and a monostable trigger circuit 445 at its output end.

It is the overvoltage of this inductance-capacitance filter 441 which enables the circuit 44 to deliver clock signals, even during periods as long as those corresponding to intervals of 10 zeros. To this end, the overvoltage of the filter was fixed at Q=30.

The circuit 44 is therefore capable of restoring clock signals without modification from shaped signals 430 corresponding in particular to those in HDB$_n$-codes with n comprised between 1 and 10.

Thus, by adapting on the one hand the first transcoder 1 for a code extending from the HDB$_1$ code to the HDB$_{10}$ code and, on the other hand, the shift registers of circuit 47 to contain from 2 bits to 11 bits, the complete system provides for the high-density recording of numerical data on magnetic tape.

The system which has just been described as one example of the use of HDB$_n$-codes adapted to the high density recording of data on magnetic tape is capable of performances of the following order:
flow of numerical data: 30 megabits per second,
error factor introduced: less than $10^{-6}$.

The use of HDB$_n$-codes for the high density recording of magnetic data as proposed in accordance with the invention is by no means limited to magnetic tape recorders such as those which have beed described by way of example.

The system may be directly adapted to systems for recording on magnetic supports of the type used for data processing, such as tapes, discs, for signal processing, for simulating real signals recorded during test runs, for classification in various fields, such as radar, sonar, the speech field, etc., telecommunications.

What is claimed is:

1. A magnetic storage system for numerical data coded in the high density code of order n (HDB$_n$) comprising: recording means having an input receiving binary data in the "non return to zero" (NRZ) code and synchronization clock signals, said recording means including a first transcoder transforming said input (NRZ) data into ternary code (HDB$_n$) data, a magnetic head to which said ternary coded signal is applied, a storage medium on which said ternary coded signal is recorded through said magnetic head, receiving further premagnetization signals from an oscillator, reading means having a magnetic head reading said storage medium; means for recovering said data in the HDB$_n$-code and said synchronization clock signals and circuit means for detecting the violation of alternating polarity in said HDB$_n$-code, a second transcoder receiving said HDB$_n$-code, said clock signals and said signal acknowledging violation of polarity and delivering the data in the original NRZ, said first transcoder comprising a buffer memory and a read only memory (ROM), said buffer memory having two input terminals and one output terminal, said ROM having one input terminal and two output terminals, said buffer memory receiving on one input terminal through a first gate, the signal coded NRZ, the second input of said buffer memory being connected through a second gate to the first output terminal of said ROM, the output of said buffer memory being connected through a third gate to the first input terminal of said ROM, the three gates being controlled by said clock signals, said buffer memory storing n+3 digits: B$_0$, B$_1$, B$_2$ ... B$_{n+2}$ with the least signification digit B$_0$ being supplied by the NRZ signal, the remaining digits $B_1, B_2 \ldots B_{n+2}$ being supplied by said ROM; said buffer memory receiving the $n+3$ digits in the first half cycle of said clock signal, said second output terminal of the ROM supplying two digits, means delivering the signal coded $HDB_n$ upon application of said two digits, said ROM receiving in the second half cycle of said clock signal, said $n+3$ digits from said buffer memory for addressing said ROM.

2. A magnetic storage system as claimed in claim 1, including a second transcoder having an input terminal and two output terminals, said input terminal being connected to equalizing filter means, said filter being connected to clipping means; said clipping means being connected, to polarity violation detector means to a decision circuit and to clock recovering means; said decision circuit receiving the signals from said clock recovering means; two shift registers connected to the outputs of said polarity violation means, to said decision circuits and to said clock recovering means; the outputs of said two shift registers being applied to a subtractor, the output of said subtractor being one of the output terminals of said second transcoder, the second output terminal being the output of said clock recovering means; the input terminal of said second transcoder receiving the signal of said reading magnetic head, said equalizing filter compensating for the write-read distorsion, said decision circuit comparing said clipped signal with two reference voltages $+V_{max}/2$ and $-V_{max}/2$ and delivering the ternary coded signal $HDB_n$.

3. A magnetic storage system as claimed in claim 2, including clock recovering means having an input connected to said clipping means and comprising in series a low-pass filter, a second clipping circuit and a monostable trigger circuit: said monostable trigger circuit restoring at its output said clock signal.

4. A magnetic storage system as claimed in claim 2, wherein said low-pass filter has an overvoltage of the order of 30.

5. A system as claimed in claim 1, wherein for $n=3$ said first transcoder comprises 64 possible ternary combinations of four following values of said $HDB_3$ coded signal.

* * * * *